July 29, 1924.
W. GILL
COVER FOR RECEPTACLES
Filed March 30, 1923
1,502,948
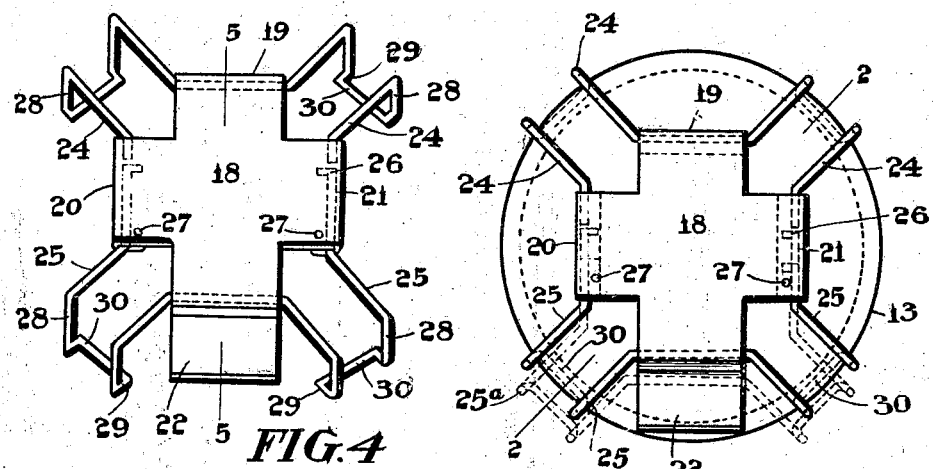
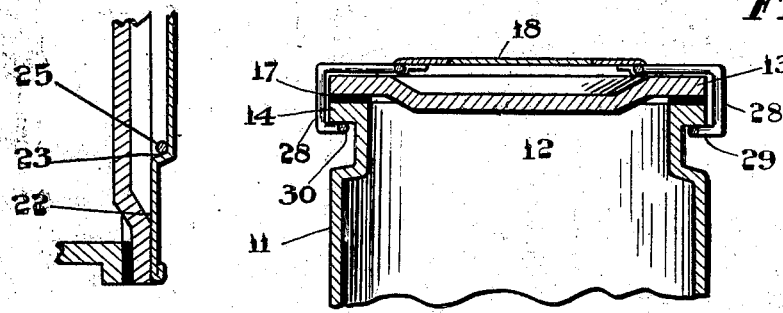
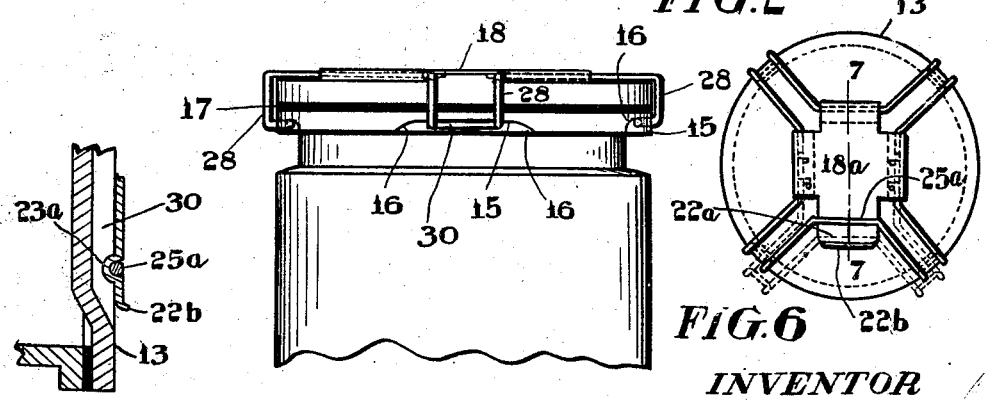
INVENTOR
WILLIE GILL
BY Fetherstonhaugh & Co
ATTORNEYS Patented July 29, 1924.

1,502,948

UNITED STATES PATENT OFFICE.

WILLIE GILL, OF MONTREAL, QUEBEC, CANADA.

COVER FOR RECEPTACLES.

Application filed March 30, 1923. Serial No. 628,747.

*To all whom it may concern:*

Be it known that I, WILLIE GILL, a subject of the King of Great Britain, and resident of the city of Montreal, in the Province of Quebec and Dominion of Canada, have invented certain new and useful Improvements in Covers for Receptacles, of which the following is a full, clear, and exact description.

This invention relates to new and useful improvements in covers for receptacles, and the object of the invention is to provide a simple, inexpensive, and sanitary cover for preserving jars, milk bottles, medicine containers or the like.

Another object is to provide a cover for receptacles which will be easily adjusted to suit the operation of cleaning or filling the receptacle.

A further object is to provide a device which will form a perfect seal for jars or the like.

In my invention, I provide a glass cover fitting over the aperture of a bottle, jar or the like and between the cover and the jar a rubber or composite gasket is placed to provide a seal for the jar. Over the cover, I provide a wire guard, part of which is slidably mounted in a guide, said guard being adapted to engage with a ridge formed in the neck of the bottle. I also provide recesses cut in the ridge and adapted to receive the fingers or engaging parts of the wire guard. The recesses are wedge-shaped and, by turning the guard, the cover is pressed against the gasket, which is in turn pressed against the upper surface of the neck of the jar or bottle, thereby sealing it.

In the drawings which illustrate the invention:—

Fig. 1 is a plan view of the device fitted to a jar.

Fig. 2 is a sectional elevation of a cover and a jar taken on the line 2—2, Figure 1.

Fig. 3 is an elevation of the cover and jar.

Fig. 4 is a perspective view of a wire guard.

Fig. 5 is a sectional view taken on the line 5—5, Figure 4.

Fig. 6 shows a modification of the device.

Fig. 7 is a cross section taken on the line 7—7, Figure 6.

Referring more particularly to the drawings, 11 designates a preserving jar, which is provided with an aperture 12, over which a glass or other sanitary type of cover 13 is placed. The neck of the jar is provided with a ridge 14, which extends around the jar and is provided with recesses 15 cut parallel with the top of the jar but on the underside of the ridge. The ends 16 of said recesses are gradually curved to meet the thickness of the ridge. Between the cover 13 and the top of the jar a rubber or rubber composite gasket 17 is placed to provide a sealing medium for the jar. Over the cover I provide a wire guard which is bent so as to form engaging fingers or lugs. The wire guard comprises a centre guide 18 cross shaped, the ends 19, 20 and 21 being bent over to hold the wire in position. The end 22 is provided with a ridge 23 adapted to be easily sprung into engaging position with the wire guard, said end being extended to provide an easy gripping medium for operating the guard. The engaging wires are two in number and are designated 24 and 25 respectively. The wire 24 is fixed to the centre guide 18 and is held in position by the bent ends 19, 20 and 21. The wire 25 is slidably mounted in the ends 20 and 21 and is provided with lugs 26, which engage with indentations 27 in the guide to limit the movement of the wire. The wires 24 and 25 are bent at right angles to the top of the jar, as designated at 28, and are made to clear the outside edge of the rim of the jar. They are then bent inwardly, as shown at 29, to form engaging lugs or fingers, said lugs or fingers being adapted to engage with the underside of the ridge and also to ride on the ends of the recesses when said guard is turned in either direction. The wires are continuous and the lugs are first formed by bending the wires to engage with the sides of the cross, bending them at 45° outwardly from the cross-shaped guide, then bending them at 90° to clear the ridge of the jar, and finally inwardly at 90° to grip the underside of the ridge.

The operation of the device is as follows:

The cover is placed over the aperture with the rubber gasket between the upper face of the rim and the underside of the cover. The extension or side 22 of the guide 18 is raised and the wire 25 opened to the position shown in dotted lines and designated 25ª in Figure 1. The wire guard is then placed over the cover, the lugs or fingers 30 engaging in the recesses on the underside of the jar rim. The wire 25 is then pressed inwardly until the ridge 23 of the centre guide 18 engages with the said wire and locks it in position. In this condition, the contents of the jar may be heated and the air extracted from the jar with the cover slack, allowing the air to exhaust from the jar. By turning the guard, the fingers or lugs engage with the curved ends 16 of the recesses 15 and exert a pressure on the cover, thereby sealing the receptacle.

In the form shown in Figures 6 and 7, the connecting portion of the wire 25$^a$ which is slidably mounted in the cross-shaped centre guide 18$^a$ is adapted to pass over the top of the centre guide extension 22$^a$, which has a ridge 23$^a$ pressed in it to engage with said wire between the fingers. The end of the extension 22$^b$ may be curved upwardly to provide a grip for unlocking the connecting wire and also to limit the movement of the sliding fingers. This extension may be short, so that it may be operated within the recess 30 of the glass cover 13.

Having thus described my invention, what I claim is:—

1. In a device of the character described, a receptacle having a ridge formed integral with the neck and positioned on the outside of the receptacle, recesses cut in the underside of the ridge and parallel with the top of the receptacle, a cover adapted to fit over the top of the receptacle, a rubber or like gasket between the cover and said top, a centre guide, cross-shaped to fit over said cover, a wire fixed to the centre guide by bending the ends of the cross guide over the wire, said wire being bent over the side of the ridge and adapted to engage with the recesses, a second wire slidably mounted in said guide and adapted to engage with the remaining recesses in the ridge, and means integral with the guide to lock and unlock said second wire.

2. A device according to claim 1, having means integral with the cross guide to limit the movement of the second wire.

3. In a device of the character described, a receptacle having a ridge formed integral with the outside and near the top of the receptacle, four recesses cut in the underside of the ridge, at right angles to one another and parallel with the top of said receptacle, a cover, a gasket between the cover and said top, a cross-shaped centre guide, a wire fixed to the centre guide bent over the edge and under said ridge and adapted to engage with two of the recesses, a second wire slidably mounted in said guide, said wire being bent over the edge and under the ridge and adapted to be a free fit in the remaining recesses in the rim, means integral with the cross guide to lock the second wire in the engaging position, means integral with the guide to limit the movement of the second wire, and means integral with the ridge to exert a pressure on the cover and gasket on the turning of the wires.

4. In combination with a receptacle having a lip and recesses in said lip, a cover, a center guide, and a wire guard carried by the guide including a plurality of relatively adjustable fingers adapted to engage with said recesses in the lip and to exert pressure on the cover when rotated.

5. In combination with a receptacle having a lip and recesses in the underside of said lip, a center guide, and a wire guard carried by the guide including fixed and slidably mounted fingers adapted to engage with said lip to seal said receptacle.

6. In combination with a receptacle having an outwardly projecting lip and recesses formed in the underside of said lip, a cover, a centre guide, a plurality of fingers fixed to said guide and adapted to engage with the recesses in said lip, and a plurality of fingers slidably mounted in said guide and adapted to engage with the remaining recesses in the lip.

In witness whereof, I have hereunto set my hand.

WILLIE GILL.